S. ARAKI.
AUTOMOBILE LAMP.
APPLICATION FILED JULY 20, 1918.
1,324,488.
Patented Dec. 9, 1919.
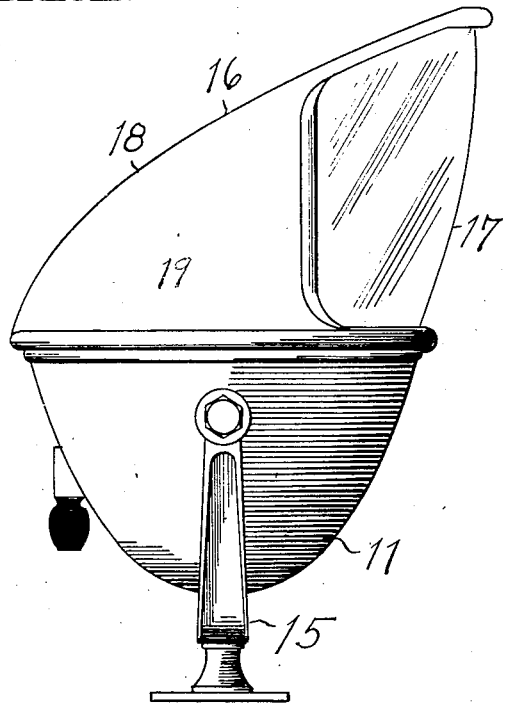
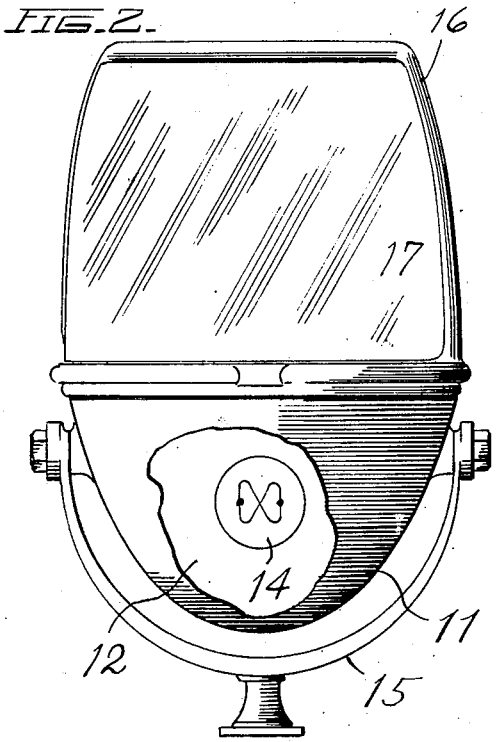
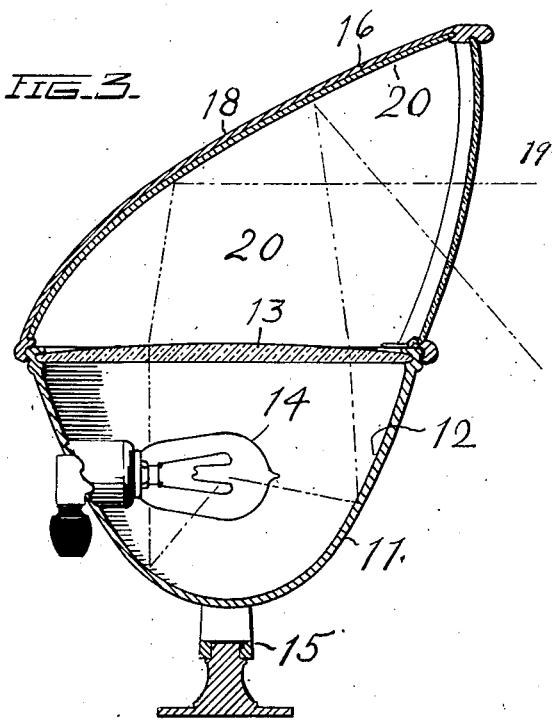
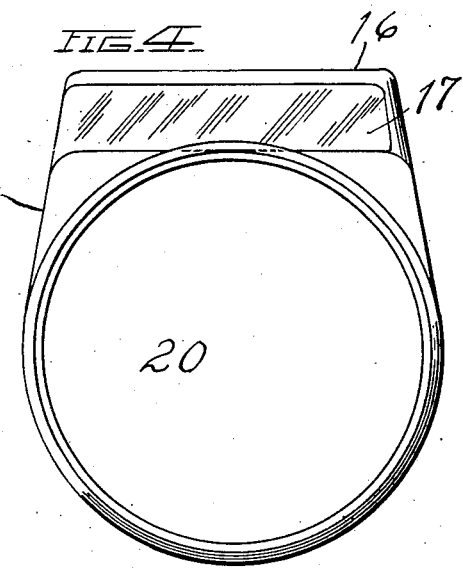
INVENTOR:
Susumu Araki.
By His Atty.
Edward H. Kojima

UNITED STATES PATENT OFFICE.

SUSUMU ARAKI, OF LOS ANGELES, CALIFORNIA, ASSIGNOR TO ZENKICHI AKAHOSHI, OF LOS ANGELES, CALIFORNIA.

AUTOMOBILE-LAMP.

1,324,488.   Specification of Letters Patent.   Patented Dec. 9, 1919.

Application filed July 20, 1918. Serial No. 245,955.

*To all whom it may concern:*

Be it known that I, SUSUMU ARAKI, a subject of the Emperor of Japan, residing at Los Angeles, in the county of Los Angeles and State of California, have invented a new and useful Automobile-Lamp, of which the following is a specification.

This invention relates to certain new and useful improvements in pilot-lamps for vehicles such as automobiles, and has for its objects to insure additional safety in travel, and to so illuminate the street, roadway, or path of travel, that the region immediately in front of the automobile as well as for a distance ahead, is plainly discernible to the chauffeur, while all rays from the lamp are deflected forward in a straight line so as not to disconcert the driver of the automobile approaching from the opposite direction, and to otherwise deflect, equalize, and diffuse the rays to produce the effect of dimmers as are employed with the ordinary lamp.

The invention is applicable to boats, locomotives, and vehicles of any type, but is particularly adapted for use upon automobiles.

My invention consists in applying a signal lamp in a manner to project the rays in a vertical direction, and to provide a superposed and curved reflector adapted to project and reflect the rays in a straight horizontal direction, and a portion of the rays in a downwardly inclined direction to thoroughly illuminate the path of travel in proximity to the vehicle.

With the above primary and other incidental objects in view, the invention consists in the novel features of construction, and the combination of parts, as hereinafter described and set forth in the claims.

Upon the annexed drawings, Figure 1 is a side elevation of an automobile pilot lamp embodying my invention. Fig. 2 is a front elevation of the lamp. Fig. 3 is a vertical sectional view of the lamp. Fig. 4 is a bottom plan view of the reflector casing.

Referring to the drawings, the main casing 11 is of the usual parabolic form, provided with the inner reflecting face 12, and provided with a condensing lens 13. An electric bulb 14 is provided for illumination, and the casing is adjustably mounted in the bracket 15. The lamp casing is normally adjusted with the condensing lens uppermost. A hood 16, is secured in fixed relation to the casing, and is provided with a transparent closure 17, forming the front wall of the hood, and extending to form a portion of one side thereof. The top wall 18, and side walls 19, of the hood, are provided with a suitable reflector element 20. The reflector is curved to project the rays of light in a forward inclined and horizontal direction. The light is partly equalized and diffused by reflection, and also by deflection when transmitted through the transparent closures in the hood. The transparent closure forming a portion of the side may be colored preferably either red or green, while the front portion is uncolored. As shown in Figs. 1 and 2, the transparent closure constitutes the front and a portion of one side of the hood.

From the foregoing description taken in connection with the accompanying drawings, the advantages of the device will be readily understood, and, while the device as described is well adapted to serve the purposes for which it is intended, it is to be understood that such changes, alterations, and modifications as may fall within the scope of the appended claims, may be made if desired; the invention comprising illuminative means arranged to project the rays of light upward, and reflecting means associated therewith to deflect the light horizontally.

What is claimed is:

1. In an automobile lamp, a main casing forming a parabolic reflector, illuminating means mounted therein, a condensing lens mounted in front of the illuminating means, all arranged to project the light rays upward, a hood superposed above the condensing lens, a curved reflector forming the top and sides of the hood and adapted to project the rays from the condensing lens in a forwardly inclined and horizontal direction, and a transparent closure forming the front wall and a portion of the side wall of the hood.

2. A parabolic casing provided with an adjustable supporting bracket and having an interior reflecting surface, illuminative means within the parabolic casing, a condensing lens closure for the parabolic casing, a superposed hood having curved and inclined walls, reflecting elements mounted on the walls of the hood adapted to alter the projection of light rays from the condensing lens and illuminative means, and a transparent closure forming the front wall and a portion of one side of the hood.

In testimony whereof I hereunto affix my signature this 6th day of July, 1918.

SUSUMU ARAKI.

In presence of—
FREDERIC M. KEENEY,
J. W. MASTRO.